H. C. BROWN.
CUSHION TREAD VEHICLE WHEEL.
APPLICATION FILED SEPT. 6, 1906.
976,846.
Patented Nov. 29, 1910.
2 SHEETS—SHEET 1.
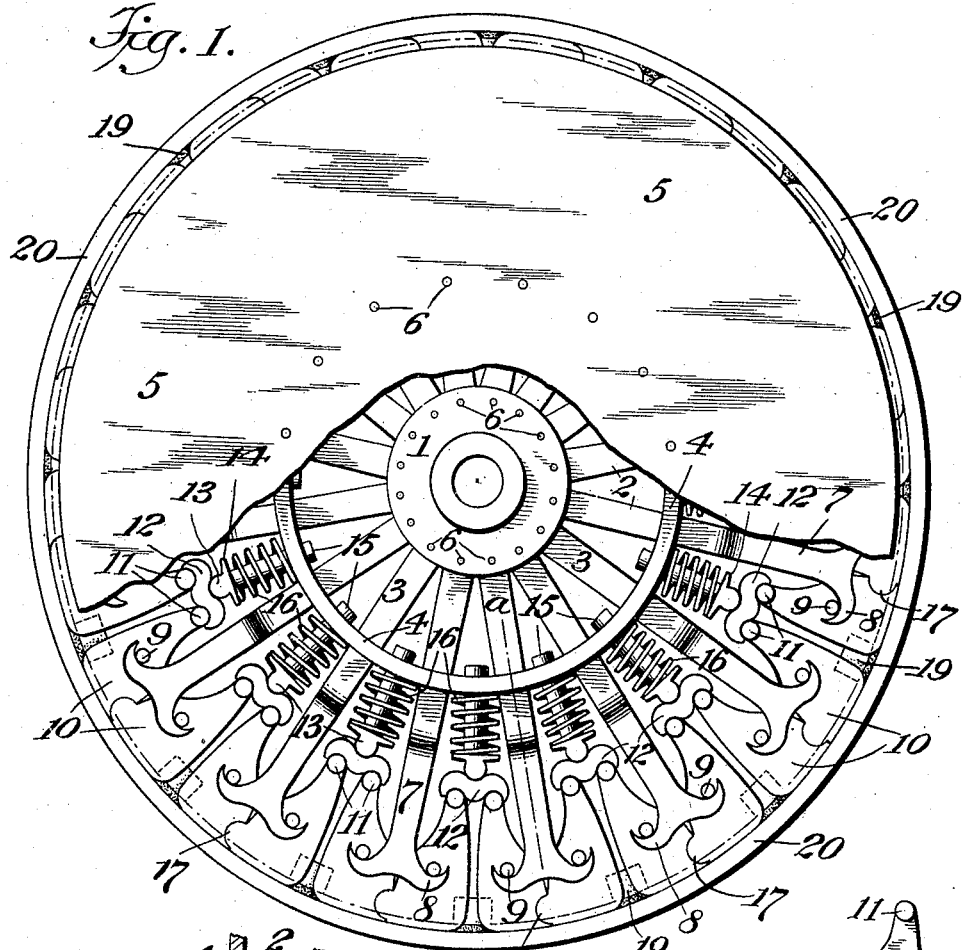
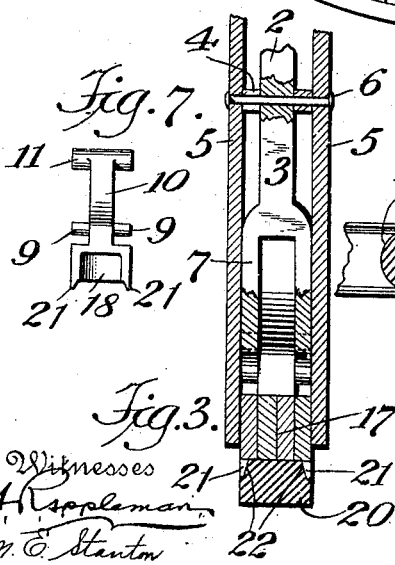
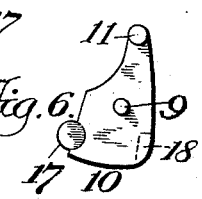
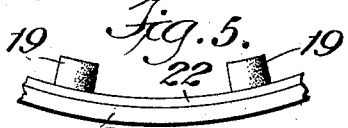
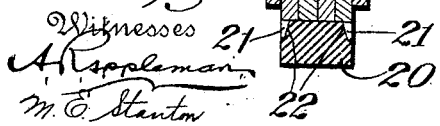

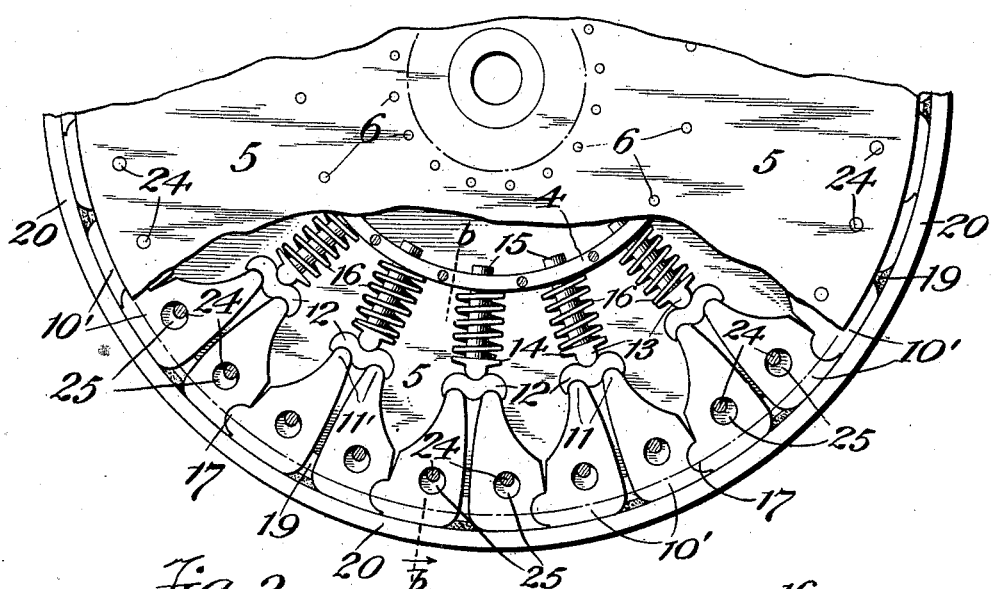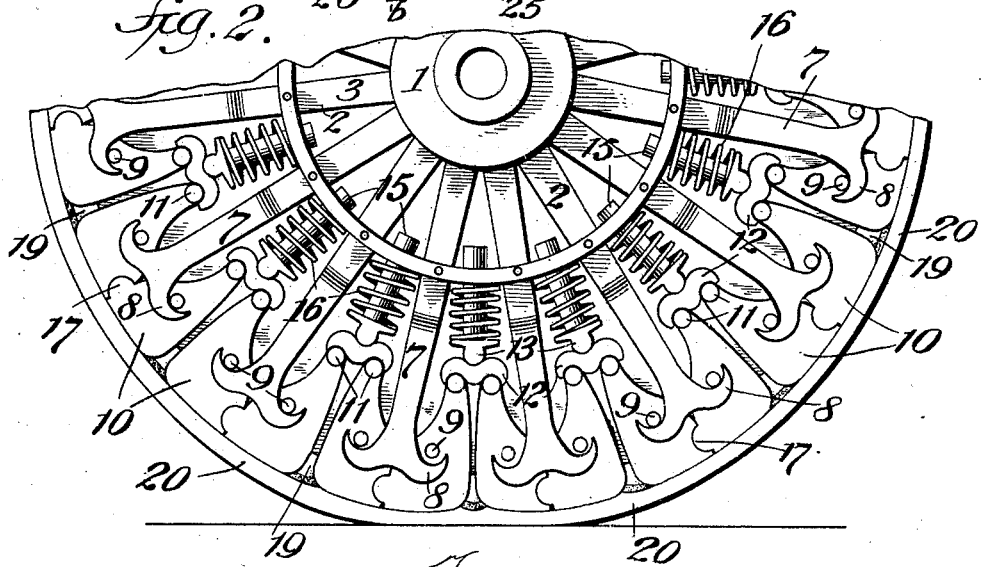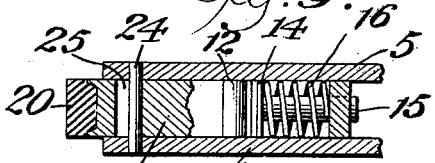

UNITED STATES PATENT OFFICE.

HENRY C. BROWN, OF NEW YORK, N. Y., ASSIGNOR OF TWO-THIRDS TO HENRY STOCKMAN, OF NEW YORK, N. Y.

CUSHION-TREAD VEHICLE-WHEEL.

976,846.  Specification of Letters Patent.  Patented Nov. 29, 1910.

Application filed September 6, 1906.  Serial No. 333,440.

*To all whom it may concern:*

Be it known that I, HENRY C. BROWN, citizen of the United States, and resident of New York, in the county of Kings and State of New York, have invented certain new and useful Improvements in Cushion-Tread Vehicle-Wheels, of which the following is a specification.

This invention relates to cushion-tread wheels adapted for various kinds of vehicles but more especially designed for automobile vehicles.

The invention has for its object to provide a wheel having a yielding or cushion-tread which will accommodate itself to inequalities of more or less rough roads thereby relieving occupants of the vehicle from undue jar or shock while promoting durability of the wheel tires and the whole vehicle.

The invention comprises a cushion-tread vehicle wheel including peripheral thrust-blocks having limited radial bodily movement and also adapted to rock in the plane of the wheel, and means, preferably opposite fixed side plates, preventing lateral displacement of the blocks and the elastic means or devices which normally force them outward. The blocks are preferably lap-jointed in pairs next the wheel periphery, and elastic media also preferably are interposed between outer parts of adjoining pairs of blocks to permit of both radial compression and circumferential movement of the individual pairs of blocks while in action.

This invention also includes various details of construction and combinations of parts of the vehicle wheel; all as hereinafter described and particularly pointed out in the appended claims.

Reference is made to the accompanying drawings forming part of this specification, and in which—

Figure 1 is a side view of one construction of vehicle wheel embodying the invention, and with one outside face-plate partly broken away. Fig. 2 is a side view of lower portions of this wheel illustrating the yielding of the tread and internal mechanism under the load. Fig. 3 is a detail broken out transverse radial section, taken on the line *a—a* in Fig. 1, but showing opposite outside plates of the wheel. Fig. 4 is an outside edge view of a portion of the wheel rim specially showing the yielding thrust blocks and with the rubber tire removed excepting its integral cushion portions which are interposed between jointed pairs of thrust-blocks and are shown in horizontal section. Fig. 5 is a side view of a portion of the rubber tread or tire and two of its inwardly projecting thrust-block cushions. Fig. 6 is a side view of one of the thrust-blocks. Fig. 7 is an edge view thereof showing the recess for the tire cushion. Fig. 8 is a side view of the lower part of a modified form of wheel embodying the main or essential features of the invention, and with its outside plate partly broken away; and Fig. 9 is a transverse radial section, taken on the line *b—b* in Fig. 8, but showing opposite outside plates of the wheel.

First referring more particularly to Figs. 1 to 7 of the drawings, the numeral 1 indicates the wheel hub, and the numerals 2 indicate spokes fixed in any way to the hub by their stem portions 3 which also pass fixedly through a metal ring 4 surrounding the hub. To this ring 4, and also to the wheel hub 1, opposite side plates 5, 5, are fixed by bolts 6, or otherwise. The outer part of each spoke is forked at 7, thus forming two laterally opposed limbs, the extremity of each of which is formed with two oppositely directed lips 8, 8, lying in the general plane of the wheel and preferably having rounded hook-shaped inner shoulders in which normally rest stop pins 9, 9, which are fixed to opposite sides of the thrust-blocks 10, the main body portions of which fit movably between the limbs of the spoke forks 7. The inner end of each block 10 is preferably formed with a lateral rounded cross-head 11, and the two heads 11, 11, of adjoining blocks 10, 10, ranging between the forks 7 of two adjoining spokes 2, fit within outer concavities of a bridge-plate 12 which at its inner central portion preferably has a rounded socket in which loosely rests a rounded lug 13 on the head 14 of a radial pin 15 which passes loosely through and has play in the wheel ring 4. On this pin 15, and between its head 14 and the ring 4, is placed a normally expanding cushioning device, such as a spiral spring 16. The parts 13, 14, 15, thus constitute a radially guided plunger which is forced outward by the spring 16 against the bridge-plate 12, and through said plate acts to force the thrust-blocks 10 outward.

The adjoining edges of outer portions of the two thrust-blocks 10, 10, whose respective pins 9 are engaged by the hooks 8 of the limbs of the fork 7 of each spoke 2, are suitably coupled or jointed together so as to allow either one of these two blocks to rock slightly upon the other in the general plane of the wheel and also cause them to coöperate in resisting radial and lateral strains upon the individual blocks resulting from contact of the wheel tread with the road or road obstacles. It is preferred to so connect these two adjoining blocks by tongue-and-groove joints 17, substantially like the ordinary rule joint but without a pivot pin connection. This form of joint is well calculated to permit edgewise rocking of the blocks and cause the two jointed blocks to coöperate next the wheel rim or tire in resisting the radial and lateral strains to which they may be subjected.

At its outer edge portion each thrust-block 10 also has a preferably rounded recess 18 which opposes a like recess in the adjoining block 10. These two recesses 18 together form a socket adapted to receive any approved elastic medium which by its expansion will force the blocks of each pair toward each other at their joints 17 and also yieldingly separate the jointed pairs from each other to permit compression and circumferential movement of the individual pairs. Preferably, this elastic medium is a rubber block 19 formed integrally with, or in any manner fixed to, the rubber outer tread or tire 20 of the wheel. As shown, the thrust-blocks 10 have concaved or grooved outer ends preferably forming opposing lips 21 which fit within rabbets 22 at inner side portions of the tire, and together with the integral tire blocks or parts 19, prevent lateral displacement of the rubber tire from the wheel while in service on the road.

Before briefly describing the modified wheel shown in Figs. 8 and 9 of the drawings, the operation of the above described wheel will be explained with more special reference to Fig. 2 of the drawings which shows that as the periphery of the wheel is compressed by the weight of the load, or when passing over a rough place or obstruction, the thrust-blocks 10 next the road contact portion of the tread or tire 20, yield inwardly with the tire as the block pins 9 leave their normal seats in the spoke lips or hooks 8, and the heads 11 of the blocks 10, by acting through the rocking bridge-plates 12, and the lugs 13 of the spring holding pins 15, will compress about three of the springs 16, the center one of the three being compressed more than the springs in front of and behind it, as shown in the drawings. During this relative action of the parts the elastic blocks 19 hold adjacent thrust-blocks 10 together at their rocking joints 17, while the inwardly moving blocks are guided between opposing limbs of the spoke forks 7. As soon as the compressed portion of the tire and wheel leaves the ground, the springs 16, acting through the mutually rocking parts 13, 12, 11, force the thrust-blocks 10 outward again until checked by lodgment of the block pins 9 within the spoke lips or hooks 8. It will be seen that while the peripheral tire 20 is held against lateral displacement by its attached elastic blocks 19, aided by the grooves or channels in the outer ends of the blocks 10, said blocks are individually held against lateral displacement by the opposite limbs of the forks 7, which in turn are braced laterally by the opposite side plates 5, 5, fastened by the bolts 6 to the wheel hub 1 and ring 4, and it may be also to the forks 7 of the spoke 2. It will also be obvious that the relative sizes of the spoke hooks 8, and pins 9, in connection with the elasticity of the rubber blocks 19 or other elastic medium placed between jointed pairs of the thrust-blocks 10, permits a limited circumferential movement of the tire 20 relatively to the thrust-blocks to relieve possibly injurious shocks upon the tire and running gear of the vehicle incident to sudden starting and stopping of the vehicle.

The modified wheel sufficiently shown in Figs. 8 and 9 of the drawings, while being simpler in construction, embodies all the important features of the invention, which include thrust-blocks 10', preferably having heads 11, coacting with yielding means, such as bridge-plates 12, and rocker lugs 13 on the heads 14 of radial pins 15 sustaining springs 16 or any equivalent elastic media, which normally force the blocks outward. It will be noticed that in this modified wheel the above mentioned forked spokes 2—7, having lips or hooks 8 limiting outward thrust of the blocks 10 by the springs, are omitted and are substituted by pins or bolts 24 fastened in or to the opposite outside plates 5, 5, of the wheel and passing through slots 25, preferably of ovoid form, made through the blocks 10'. These bolts and slots 24, 25, permit relative inward movement of the road contact parts of the tire 20 and the blocks 10', and as the successively compressed parts of the wheel periphery leave the road they are forced outward again by the springs 16 or equivalent elastic media, until the blocks are stopped by contact of the inner ends of their slots 25 with the pins or bolts 24. These bolts 24, together with the bolts 6 entering the wheel hub 1 and ring 4, also hold the two opposite side plates 5, 5, sufficiently close to opposite faces of the blocks 10' and the bridge-plates 12, to prevent lateral play of these parts 10', 12, and of the outer parts 13, 14, of the spring supporting pins 15.

In both forms of wheel shown in the drawings, the outside plates 5, 5, have a diameter sufficiently less than that of the wheel tread or tire 20, to permit maximum compression of road contact portions of the wheel without allowing injurious contact of said plates 5 with the ground.

Various modifications of this invention other than above mentioned, may be made by the skilled mechanic within the scope of any one or more of the appended claims.

I claim as my invention:—

1. A vehicle wheel comprising peripheral thrust-blocks interengaging in pairs and having radial bodily movement, elastic means normally forcing the thrust blocks outwardly, seat plates between said blocks and the elastic means to permit said blocks to rock in the plane of the wheel, stops engaging the thrust-blocks limiting outward bodily movement of the blocks, means preventing lateral displacement of the blocks, and a yielding tire applied around the outer ends of the blocks.

2. A vehicle wheel comprising successive pairs of interengaging peripheral thrust-blocks having radial bodily movement, elastic means acting on adjacent non-engaging pairs of thrust-blocks for normally forcing them outwardly, seat plates between said blocks and the elastic means to permit said blocks to rock in the plane of the wheel, stops limiting outward movement of the blocks, and means preventing lateral displacement of the blocks.

3. A vehicle wheel comprising peripheral thrust blocks inter-engaging in pairs at the periphery of the wheel and having radial bodily movement, elastic means normally forcing the blocks outward, said means comprising a series of resilient devices, each device acting through rocking means on a non-inter-engaging pair of thrust blocks and serving as a seat therefor to permit said blocks to rock in the plane of the wheel, means preventing lateral displacement of the blocks, and a yielding tire applied to the outer ends of the same.

4. A vehicle wheel comprising peripheral thrust-blocks interengaging in pairs at the periphery of the wheel and having radial bodily movement, elastic means normally forcing the blocks outward, stops limiting outward bodily movement of the blocks, means preventing lateral displacement of the blocks, and elastic media interposed between outer parts of adjoining pairs of non-inter-engaging blocks and permitting a limited cushioned circumferential movement of all the blocks.

5. The combination in a cushion-tread vehicle wheel, of spokes having forked portions, opposed members on each fork limb ranging in the plane of the wheel, radially movable thrust-blocks applied between the spoke fork limbs and having pins adapted to rest against said opposed members, and means normally forcing the blocks outward until their pins rest on said members to limit outward movement of the blocks, a part of said means serving as seats to permit said blocks to rock in the plane of the wheel.

6. The combination in a cushion-tread vehicle wheel, of spokes having forked portions, opposed members on each fork limb ranging in the plane of the wheel, radially movable thrust-blocks applied between the spoke fork limbs and having pins adapted to rest against said opposed members, means normally forcing the blocks outward until their pins rest on said members to limit outward movement of the blocks, a part of said means serving as seats to permit said blocks to rock in the plane of the wheel, and a yielding tire applied around the outer ends of the blocks.

7. The combination in a cushion-tread vehicle wheel, of spokes having forked portions, opposed members on each fork limb ranging in the plane of the wheel, radially movable thrust-blocks applied between the spoke-fork limbs and having pins adapted to rest against said opposed members, and means normally forcing the blocks outward until their pins rest on said members to limit outward movement of the blocks, a part of said means serving as seats to permit said blocks to rock in the plane of the wheel, said blocks interengaging in pairs at the wheel periphery.

8. The combination in a cushion-tread vehicle wheel, of spokes having forked portions, opposed members on each fork limb ranging in the plane of the wheel, radially movable thrust-blocks applied between the spoke fork limbs and having pins adapted to rest against said opposed members, means normally forcing the blocks outward until their pins rest on said members to limit outward movement of the blocks, a part of said means serving as seats to permit said blocks to rock in the plane of the wheel, said blocks being interengaged in pairs at the wheel periphery, and a yielding tire applied around the outer ends of the blocks.

9. The combination in a cushion-tread vehicle wheel, of spokes having forked portions, opposed members on each fork limb ranging in the plane of the wheel, radially movable thrust-blocks applied between the spoke fork limbs and having pins adapted to rest against said opposed members, means normally forcing the blocks outward until their pins rest on said members to limit outward movement of the blocks, a part of said means serving as seats to permit said blocks to rock in the plane of the wheel, and elastic media interposed between outer parts of adjoining pairs of blocks and permitting a limited cushioned circumferential movement of all the blocks.

10. The combination in a cushion-tread vehicle wheel, of spokes having forked portions, opposed members on each fork limb ranging in the plane of the wheel, radially movable thrust-blocks applied between the spoke-fork limbs and having pins adapted to rest against said opposed members, means normally forcing the blocks outward until their pins rest on said members to limit outward movement of the blocks, a part of said means serving as seats to permit said blocks to rock in the plane of the wheel, elastic media interposed between outer parts of adjoining pairs of blocks and permitting a limited cushioned circumferential movement of all the blocks, and a yielding tire applied around the outer ends of the blocks, said elastic media between adjoining pairs of blocks being carried by the tire.

11. A vehicle wheel comprising peripheral thrust-blocks inter-engaged in successive pairs at their outer ends and having radial bodily movement, an elastic means normally forcing each adjacent disengaged pair of blocks outwardly, spokes straddling said thrust-blocks and preventing lateral displacement of the same, means on said thrust blocks to engage the spokes and limit outward movement of said blocks, and a plate attached to the spokes on each side of the wheel.

12. A vehicle wheel comprising peripheral inter-engaging thrust-blocks arranged in pairs and having radial bodily movement, means normally forcing the blocks outwardly comprising bridge-plates, each resting upon the inner ends of two adjacent blocks, a radially movable plunger bearing against each bridge-plate, and elastic means forcing the plungers against the bridge-plates, means engaging and limiting outward movement of the thrust-blocks, and means between non-interengaging pairs of thrust blocks for preventing lateral displacement of said blocks.

13. A vehicle wheel comprising peripheral thrust-blocks having radial bodily movement and also adapted to rock in the plane of the wheel, means normally forcing the blocks outwardly comprising bridge-plates, each resting upon the inner ends of two adjacent blocks and forming rocking seats therefor, a radially movable plunger bearing against each bridge-plate, and elastic means forcing the plungers against the bridge-plates, means limiting outward movement of the thrust-blocks, means between non-interengaging pairs of thrust blocks for preventing lateral displacement of said blocks, and a yielding tire applied around the outer ends of the blocks.

14. A vehicle wheel comprising a series of thrust blocks, circumferentially interengaged in pairs, each block having a limited radial movement, separate elastic means comprising a radially movable plunger and a spring adapted to normally force each adjacent non-interengaged pair of said blocks outwardly, radial spokes, individual stop means on each interengaged pair of blocks, and means on said spokes for coöperating with said stops to limit the radial movement of said blocks, and yielding means between and separating non-interengaged pairs of blocks and operating by its elasticity to hold the interengaged pairs in connection.

Signed at New York, in the county of New York, and State of New York this 29th day of August, A. D. 1906.

HENRY C. BROWN.

Witnesses:
CHAS. F. DANE,
M. E. STANTON.